April 19, 1932.  N. D. LEVIN  1,854,596

EQUALIZING MECHANISM

Filed May 29, 1930  2 Sheets-Sheet 1

April 19, 1932. N. D. LEVIN 1,854,596
EQUALIZING MECHANISM
Filed May 29, 1930 2 Sheets-Sheet 2
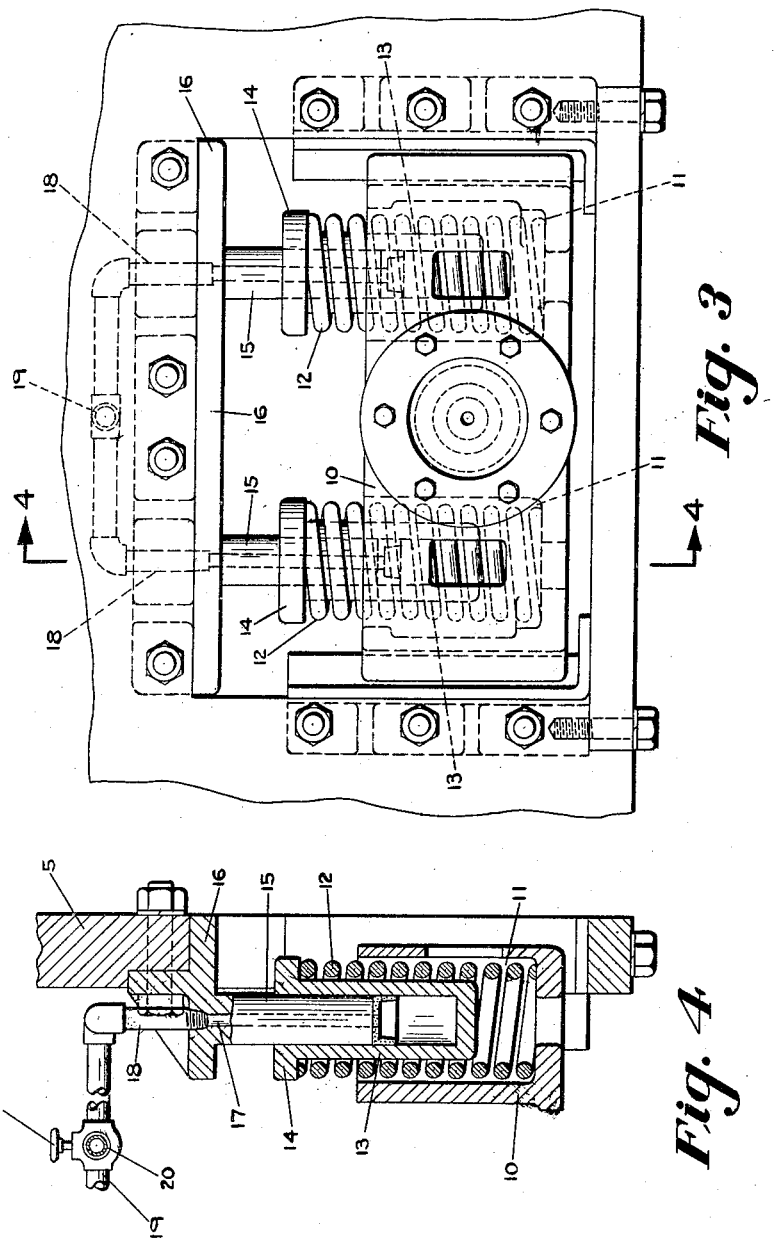

Patented Apr. 19, 1932

1,854,596

UNITED STATES PATENT OFFICE

NILS D. LEVIN, OF COLUMBUS, OHIO, ASSIGNOR TO THE JEFFREY MANUFACTURING COMPANY, OF COLUMBUS, OHIO, A CORPORATION OF OHIO

EQUALIZING MECHANISM

Application filed May 29, 1930. Serial No. 457,385.

The present invention relates to equalizing mechanism designed particularly for wheeled vehicles in situations where, by reason of uneven road beds or trackways, vertical shifting of the wheels and axles as they respond to irregularities causes relative movements between the load-carrying frame and the wheels and axles, resulting in unequal distribution of the load relative to the supporting wheels and axles.

The purpose of the invention is to provide a mechanism which will compensate for such relative movements by bringing about equalizing movements on opposite sides of the vehicle, so that a substantially uniform distribution of the load is always maintained.

In the present development I have utilized fluid pressure generating and transmitting devices for transferring the shifting movements of the parts on one side of the vehicle to the other side, as distinguished from mechanical connections, which have been heretofore used as the transmitting medium for transferring the stresses generated on one side of the vehicle to the corresponding elements on the other side. The advantage of this fluid pressure generating and transmitting means is that it is quickly responsive; it transfers the movements or stresses without appreciable loss, and it eliminates all mechanical connections for transmitting stresses from one side of the vehicle to the other with consequent avoidance of wear and replacements, which are apt to occur where mechanical transfer devices are used.

In the drawings herewith, one physical embodiment of my invention is shown, but it will be understood that this is illustrative only, and in no sense restrictive, and I have shown the invention as applied to a wheeled vehicle designed to run upon tracks and to a particular type of wheeled vehicle, namely, a mine locomotive. It will be understood, however, that the invention may be applied to different types of vehicles.

In the drawings:

Figure 3 is a side elevation of the mechanism shown in Figure 2.

Figure 4 is a view on substantially the line 4—4 of Figure 3, looking in the direction of the arrows.

Figure 1:
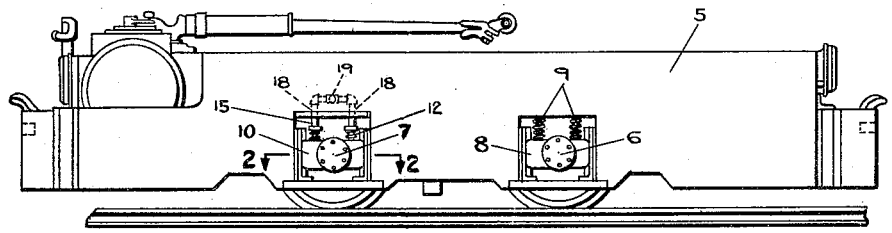
Figure 1 is a view in side elevation of a mine locomotive made up in any suitable or usual manner.
Figure 2:
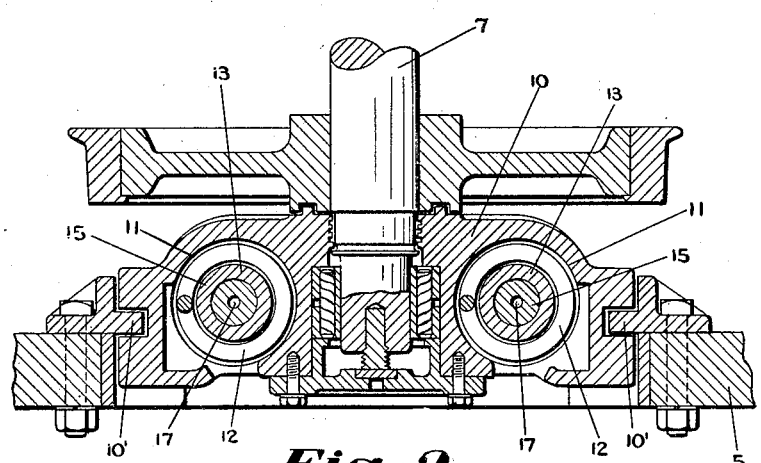
Figure 2 is a sectional view on an enlarged scale through an axle box on substantially the line 2—2 of Figure 1, looking in the direction of the arrows.

Referring to the drawings by numbers, 5 indicates the side frame of the vehicle supported on the wheeled axles 6 and 7, the axle 6 being carried by an axle box 8, having resilient members, as springs 9, engaging any suitable abutment on the frame 5 to carry the load, the axle box 8 being movable vertically in suitable guideways.

The axle 7 is mounted for rotation in the axle box 10 of any suitable construction, so far as the axle bearings and associated parts are concerned. The axle box 10 is mounted for vertical movement in an open guideway in the side frame 5, guide members 10' being provided, which engage recesses in the ends of the axle box to direct its movements. The axle box 10 is provided on each side of the axle bearing with housings 11 to receive resilient load carrying members, here shown as springs 12, there preferably being two of these load carrying resilient members as shown, one on each side of the axle to give a balanced arrangement, although it will be understood that, while the duplex arrangement is considered preferable and of practical advantage, that I do not limit the invention to the particular number of resilient load carrying members here shown or their disposition.

Each of the spring members 12 is provided with a cylindrical member 13, which forms the cylinder of a hydrostatic or hydraulic pump member, a flange 14 being provided at the top of the cylinder 13, which rests upon the spring 12 as shown in Figures 3 and 4.

The cylinder 13 engages with a sliding fit a piston member 15, rigidly secured to the side frame 5, it being here shown as formed integral with an abutment plate 16 fastened in any suitable manner to the side plate 5. The piston member 15 will be provided, as is customary in hydraulic devices of this character, with a tightly fitting cup member at the bottom, so as to prevent leakage, and it is also provided with a passage 17 coupled by a pipe 18 with a cross pipe 19, which passes from one side of the vehicle to the other.

It will be seen that springs 12, which receive the flanged hydraulic cylinders 13, not only support such cylinders resiliently, but permit a universal play or movement of such cylinders so that the hydraulic pump will accommodate itself to side play and shifting of the parts within reasonable limits, without in any way affecting its efficiency.

In order to supply losses in liquid which may occur from time to time in the operation of the mechanism, a pipe 20, having a controlling valve 21, may be coupled in at any suitable point to the cross pipe 19, and a surplus liquid supply may be carried in any suitable tank, not shown, or supplied from any suitable source when replenishment is necessary. The supplying of additional liquid to take care of losses may be accomplished either by jacking up the frame relative to the supporting axles and wheels to relieve load pressure on the hydraulic devices, under which conditions the liquid will flow in from the tank or other source, or it can be supplied by attaching a suitable pressure pump to the supply pipe 20 of sufficient power to force in such additional liquid as may be necessary.

The operation of the mechanism will be clear from the foregoing description.

When the frame 5 and axle boxes 10 shift vertically relative to one another because of irregularities in the track, the hydraulic devices, comprising cylinder 13 and piston 15 will be operated, and, by the cross-over pipe 19, which leads to the corresponding mechanism on the other side of the vehicle and bring about a corresponding but reverse action of the hydraulic instrumentalities on the other side. This will effect a compensating movement of the parts which will result in equalizing and securing a substantially uniform distribution of the load, regardless of the fact that the wheels are out of alignment vertically and the supporting axle is tilted or out of horizontal position.

The advantages of this hydraulic transmitting arrangement is, as stated, that it responds quickly; it acts to transmit the stresses without the lost motion or friction incident to mechanical parts, and it is noiseless in action. In a carefully built and efficient system, the losses of fluid will be negligible, and the wear incident to continuous use is small in comparison with the wear of mechanical transmitting means.

Such changes from the present disclosure as are within the skill of the mechanic may be made without departing from the range of the invention as expressed in the appended claims.

I claim:

1. Equalizing mechanism comprising, in combination, a frame, relatively movable supporting means including a journal box for said frame, a pressure generating device responsive to relative movements of said supporting means and said frame having a resilient member mounted on said journal box and a member rigidly mounted on said frame, and means for transmitting pressure to the opposite side of said frame to actuate equalizing mechanism and effect substantially uniform load distribution.

2. Equalizing mechanism comprising, in combination, a frame, relatively movable supporting means for said frame including a journal box, a hydraulic pump responsive to relative movements of said supporting means and said frame, one member of which is carried by said journal box and the other member of which is carried by said frame, and a hydraulic line for transmitting pressure to equalizing mechanism on the opposite side of said frame to actuate said last named equalizing mechanism and effect substantially uniform load distribution.

3. Equalizing mechanism comprising, in combination, a frame, relatively movable supporting means for said frame including a journal box, a hydraulic pump responsive to relative movements of said supporting means and said frame, one member of which is resiliently mounted on said journal box and the other member of which is carried by said frame, and a hydraulic line for transmitting pressure to equalizing mechanism on the opposite side of said frame to actuate said last named equalizing mechanism and effect substantially uniform load distribution.

4. Equalizing mechanism comprising, in combination, a frame, relatively movable supporting means for said frame including a journal box, a hydraulic pump responsive to relative movements of said supporting means and said frame, one member of which is resiliently mounted on said journal box and the other member of which is rigidly mounted on said frame, and a hydraulic line for transmitting pressure to equalizing mechanism on the other side of said frame to actuate said last named equalizing mechanism and effect substantially uniform load distribution.

5. Equalizing mechanism comprising, in combination, a frame, relatively movable supporting means for said frame including a journal box, a plurality of hydraulic pumps responsive to relative movements of said supporting means and said frame and having their cooperating parts mounted respectively on said box and said frame, and a hydraulic line for transmitting pressure from said pumps to equalizing mechanism on the opposite side of said frame to actuate said last named equalizing mechanism and effect substantially uniform load distribution.

6. Equalizing mechanism comprising, in combination, a frame, relatively movable supporting means for said frame including a journal box, a plurality of hydraulic pumps responsible to relative movements of said supporting means and said frame, symmetrically disposed on said journal box with respect to the point of support of the journal, and a hydraulic line for transmitting pressure from said pumps to equalizing mechanism on the opposite side of said frame to actuate said last named equalizing mechanism and effect substantially uniform load distribution.

7. Equalizing mechanism comprising, in combination, a frame, relatively movable supporting means for said frame including a journal box, a plurality of hydraulic pumps responsive to relative movements of said supporting means and said frame, symmetrically disposed on said journal box with respect to the point of support of the journal, resilient mountings on said journal box for said pumps, and a hydraulic line for transmitting pressure from said pumps to equalizing mechanism on the opposite side of said frame to actuate said last named equalizing mechanism and effect substantially uniform load distribution.

8. Equalizing mechanism comprising, in combination, a frame having guideways, relatively movable supporting means for said frame including a journal box movable in said guideways, hydraulic pump cylinders mounted on said journal box, hydraulic pistons carried by said frame, and a hydraulic line to transmit pressure from said pumps to equalizing mechanism on the opposite side of said frame to actuate said last named equalizing mechanism and effect substantially uniform load distribution.

9. Equalizing mechanism comprising, in combination, a frame having guideways, relatively movable supporting means for said frame including a journal box movable in said guideways, universally movable hydraulic pump cylinders mounted on said journal box, hydraulic pistons carried by said frame, and a hydraulic line to transmit pressure from said pumps to equalizing mechanism on the opposite side of said frame to actuate said last named equalizing mechanism and effect substantially uniform load distribution.

10. Equalizing mechanism comprising, in combination, a frame having guideways, relatively movable supporting means for said frame including a journal box movable in said guideways, universally movable hydraulic pump cylinders resiliently mounted on said journal box, hydraulic pistons carried by said frame, and a hydraulic line to transmit pressure from said pumps to equalizing mechanism on the opposite side of said frame to actuate said last named equalizing mechanism and effect substantially uniform load distribution.

11. Equalizing mechanism comprising, in combination, a frame having guideways, relatively movable supporting means including a journal box for said frame movable in said guideways, springs carried by said journal box on either side of the point of support of the journal, hydraulic cylinders inserted in and supported by said springs, hydraulic pistons carried by said frame, and a hydraulic line to connect said pumps with equalizing mechanism on the opposite side of said frame to actuate said last named equalizing mechanism and effect substantially uniform load distribution.

12. Equalizing mechanism comprising, in combination, a frame having guideways, relatively movable supporting means including a journal box for said frame movable in said guideways, springs carried by said journal box on either side of the point of support of the journal, hydraulic cylinders loosely mounted in said springs, hydraulic pistons carried by said frame, and a hydraulic line to connect said pumps with equalizing mechanism on the opposite side of said frame to actuate said last named equalizing mechanism and effect substantially uniform load distribution.

13. Equalizing mechanism comprising, in combination, a frame, relatively movable supporting means for said frame including a journal box, springs carried by said journal box, hydraulic pump members provided with spring engaging flanges inserted in said springs, hydraulic pistons rigidly attached to said frame and cooperating with said cylinders, and a hydraulic line for transmitting pressure from said pumps to equalizing mechanism on the opposite side of said frame to actuate said last named equalizing mechanism and effect substantially uniform load distribution.

14. In mechanism of the class described, relatively movable pump supporting members, a helical spring carried by one of said members, a fluid pressure pump part loosely mounted on said spring, a complementary pump part carried by the other of said members to effect pump operation on relative movement of said members, and means for transmitting the generated pressure to the point of use.

15. In mechanism of the class described, relatively movable supporting members one of which is provided with spring receiving sockets, springs mounted in said sockets, a fluid pressure pump cylinder loosely mounted on said spring, a fluid pressure pump piston carried by the other of said members to effect pump operation on relative movements of said members, and means for transmitting the generated pressure to the point of use.

16. In mechanism of the class described, a journal box provided with a spring receiving socket, a spring mounted in said socket, a fluid pressure pump cylinder loosely mounted in said spring, a fluid pressure pump piston engaging said cylinder and movable relative thereto, and means for transmitting the pressure generated by said pump to the point of use.

17. In mechanism of the class described, a journal box adapted to engage and move in a guideway and provided with spring receiving sockets on either side of the point of support of the journal, springs in said sockets, flanged fluid pressure pump cylinders loosely mounted in said springs, said flanges resting on said springs, relatively movable fluid pressure pump pistons in said cylinders, and means for transmitting the generated pressure to the point of use.

18. In mechanism of the class described, a journal box adapted to engage and move in a guideway and provided with spring receiving sockets, coil springs mounted in said sockets on either side of the support of the journal, flanged fluid pressure pump cylinders inserted in and with their flanges engaging said springs, fluid pressure pump pistons mounted on a support movable relative to said journal box to effect pump operation on relative movement of said support and box, and means for transmitting the generated pressure to the point of use.

19. Equalizing mechanism comprising, in combination, a frame, relatively movable supporting means for said frame including a journal box, a fluid pressure generating device responsive to relative movements of said supporting means and journal box and said frame having members mounted on said journal box and on said frame respectively, and means for transmitting pressure to the opposite side of said frame to actuate equalizing mechanism and effect substantially uniform load distribution.

In testimony whereof I have hereunto set my hand.

NILS D. LEVIN.